Figure 1:
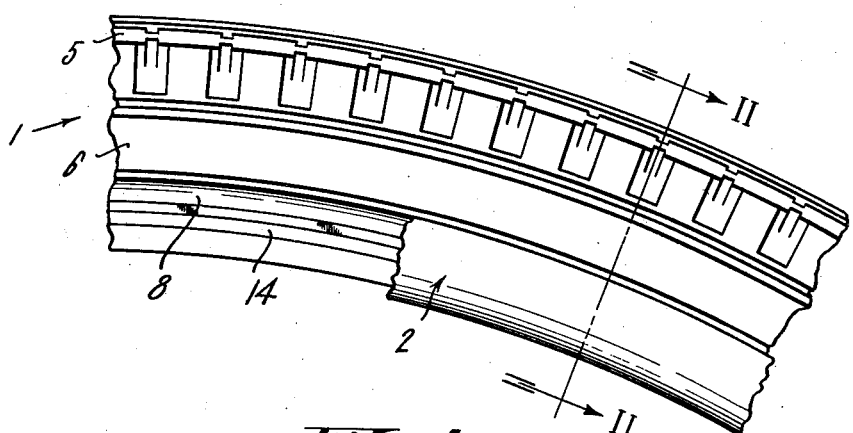

Aug. 8, 1939.   J. E. CADY   2,169,037
PNEUMATIC TIRE
Filed Oct. 7, 1936

INVENTOR.
JOHN E. CADY
BY
ATTORNEY

Patented Aug. 8, 1939

2,169,037

UNITED STATES PATENT OFFICE 2,169,037

PNEUMATIC TIRE

John E. Cady, Indianapolis, Ind., assignor, by mesne assignments, to United States Rubber Company, New York, N. Y., a corporation of New Jersey Application October 7, 1936, Serial No. 104,450

5 Claims. (Cl. 152—352)

This invention relates to pneumatic tires of the single tube type, having a relatively small cross sectional diameter, such as a bicycle tire, and more particularly to an improved single tube pneumatic tire having a construction adapted to be mounted on a rim and secured thereto by the frictional resistance of the tire against the rim whereby the use of adhesive rim cements may be eliminated. This invention also relates to the assembly of the tire and its rim.

In conventional practice single tube tires are retained on the wheel rims by adhering the tires to the rims with adhesive cements. The use of cements requires an additional operation in mounting the tires and makes it more difficult to remove them.

The single tube tire embodying the present invention is retained and prevented from slipping on the rim by the frictional resistance of the tire against the rim. Such resistance is caused by the gripping action of the rim engaging portion of the tire on the rim resulting primarily from the shape and construction of the base portion and the pressure exerted by the internal or inflating pressure of the tire. The base of the tire is provided with annular grooves and shoulders which respectively tightly engage the rim edge beads and spaced annular shoulders on the rim when the tire is inflated. The portion of the base extending between the shoulders is relatively thick and is normally suspended out of contact with the rim while the tire is inflated so that the tire will not adhere to the rim and make it difficult to remove the tire. The center portion of the base may contact with the spoke nipples to some extent when the tire is inflated. This portion being relatively thick the tire is not injured by the nipples, but on the other hand the grip obtained by such base portion on the nipples aids in preventing the tire from slipping around the rim. When the tire is not inflated the pressure of the spoke nipples on the base is substantially relieved and the central part of the base is suspended a sufficient distance from the rim center that it may be flexed towards the rim when the rim engaging grooves of the tire are pressed together and thereby facilitate the removal of the tire.

Among other advantageous characteristics of the tire embodying this invention, the thick portion of the base between the supporting or rim engaging shoulders protects the tire from injury by tire tools, and assists in retaining the shoulders of the tire on the corresponding shoulders of the rim. The carcass is made of equal thickness around its transverse cross sectional circumference so that the strength of the suspended portion of the base will be of equal strength to the other portions of the tire.

Reference may be had to the accompanying drawing for a specific illustration of an embodiment of the invention.

Figure 2:
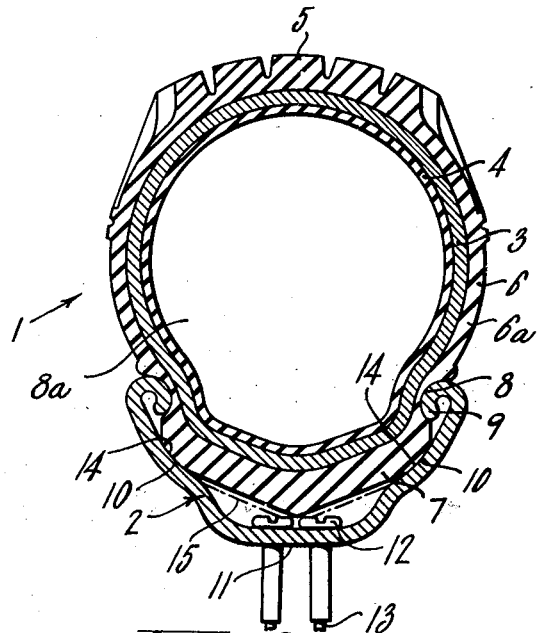

In the drawing, Fig. 1 shows a side elevational view of a portion of a pneumatic tire and rim; and, Fig. 2 is a transverse view, in section, of a pneumatic tire and rim, taken along lines II—II of Fig. 1.

With reference to the drawing, the pneumatic tire 1 is mounted on a rim 2. The tire 1 is of the single tube type, and comprises a reinforcing and stretch resisting carcass 3, a rubber lining 4 secured to the interior of the carcass 3, and a wear resistant tread 5. The carcass 3 may be made of square woven fabric cut on a bias of 45° with the weft and warp threads making such angle with the plane of rotation of the tire when applied thereto, but the carcass 3 may be constructed of other materials to advantage.

The outer covering 6a of the tire may be made of the usual rubber compositions used in conventional types of tires. It forms the tread 5, the outer covering of the side walls 6 and the base or rim engaging portion of the tire, comprising a relatively thick portion 7 and circumferential rim engaging grooves 8 molded therein on a circle about the center of rotation substantially larger than the inner circumference of the air chamber 8a having the same center.

The rim 2 is transversely curved and is provided with marginal portions turned inwardly to form annular beads 9 having edges which cooperate in complementary relation with the circumferential grooves 8 of the tire.

The rim 2 is provided with substantially conical shoulders 10 on opposite sides of the well formed in the rim center 11 and converge towards it. Spoke nipples 12 extend through the rim center 11 and are connected to spokes 13 for securing the rim to a wheel hub (not shown).

The tire 1 is provided with substantially conical shoulders 14 complementary to and adapted to engage the shoulders 10 on the rim 2.

The tire shown in Fig. 2 in full lines represents the shape of the tire when it is removed from the vulcanizing mold and also when it is on the rim in the deflated condition. When the tire is deflated and on the rim, the grooves 8 engage the rim beads 9 but the shoulders 14 of the tire may be slightly separated from the shoulders 10 of the rim due to allowable differences in the dimensions of the thick portion 7 and the opposite portions of the rim.

At all times the radius of curvature of the arc of the transverse cross section of the air chamber extending between the grooves 8 and toward the center of rotation of the tire is less than the radius of curvature of the air chamber 8a if blown to a circular shape.

When the tire is inflated the thick base portion 7 flexes radially inward to some extent and its outer wall may be moved to the position shown by the dot-dash lines 15 in Fig. 2. At the same time the rim engaging grooves 8 and the shoulders 14 are expanded laterally into tight engagement with the edges of the rim beads 9 and shoulders 10, respectively, on the tire 1 and rim 2, because the tire tends to blow to a circular shape and is prevented from doing so by the rim. Due to the conical shape of the rim shoulders 10, the shoulders 14 on the tire can expand radially outward in cross-section and be seated on the rim shoulders so that the tire shoulders 10 will carry the vertical load as well as the groove 8.

When the thick portion 7 is flexed inwardly by the inflating pressure, the central part may be caused to engage the heads of spoke nipples 12. Due to the thickness of this part of the base no injury will be done to the tire by the nipples but the engagement of the base with the nipples will hold the tire more effectively against slippage around the circumference of the rim.

Since the tire base is provided with very little support between the shoulders 14, the carcass 3 is made of the same thickness between this suspended portion as at the tread, and elsewhere, to provide the necessary strength.

The tire when deflated may be easily removed from the rim by pressing its opposite side walls towards each other. When this is done the center part of the thick portion 7 extends radially inward and permits the shoulder 14 and the grooves 8 to be moved laterally inward so that the grooves 8 may be easily disengaged from the edges of the rim beads 9.

Sometimes rubber under pressure will be caused by suction and some adhesion to stick to the rim when pressed against it. Since the central part of the thick portion 7 is maintained out of contact with the center of the rim, the resistance to the removal of the tire caused by this area sticking to the rim is eliminated.

From the foregoing description it is apparent that I have provided a tire and rim construction wherein the tire is properly supported and securely engaged with the rim among other advantageous characteristics, and notwithstanding this engagement the tire may be easily and quickly mounted or dismounted.

While I have shown and described certain preferred embodiments of my invention, it will be understood that modifications may be made therein without departing from the spirit of the invention or the scope of the appended claims.

Having thus described my invention, what I claim and desire to protect by Letters Patent is:

1. A single tube pneumatic tire comprising a carcass having an air chamber enclosed therein, a tread, side walls and a supporting base for engaging the tire rim, said base having a relatively thick wall of rubber composition provided with annular shoulders formed on its lateral edges at opposite sides of the tire center and adapted to contact with corresponding shoulders on the tire rim, said shoulders having substantially conical surfaces converging towards each other and in the direction of the hub center, and annular grooves formed in said base for engaging the tire rim bead at the opposite sides of the tire and on a substantially greater circle about the center of rotation than the inner circle of the air chamber about the same center.

2. A single tube pneumatic tire comprising a carcass, a rubber composition covering for said carcass forming a tread, side walls and a supporting base for engaging the tire rim, said carcass being of substantially uniform thickness, said base having circumferential rim engaging grooves, said base having rim engaging shoulders positioned on opposite sides of the base center and provided with conical surfaces converging towards each other in the direction of the hub center and adapted to suspend a part of said base between said surfaces.

3. A tire and rim assembly comprising a rim having spaced annular tire engaging shoulders, a circumferential center well formed between said shoulders, said tire having a carcass, a covering of rubber composition for said carcass, said covering forming a tread, outer side walls, and a supporting base for engaging said rim, said base being provided with annular shoulders between which a part of said base is normally suspended, said carcass being of a non-circular shape at the base portion when placed on said rim, said rim being so constructed that said carcass is prevented from attaining a circular shape when the tire is inflated and said annular shoulders of said base being adapted to be held in tight engagement with said rim by the internal inflating pressure.

4. A tire and rim assembly comprising a rim having inwardly facing annular tire engaging beads on its outer periphery and spaced conical annular shoulders, a circumferential center well formed between said shoulders, said tire having a carcass, a covering of rubber composition for said carcass, said covering forming a tread, outer side walls, and a supporting base for engaging said rim, said side wall covering having circumferential grooves adapted to engage said beads, said base being provided with conical annular shoulders complementary to and engaging said shoulders on said rim and between which a part of said base is normally suspended out of contact with said rim when the tire is inflated, said carcass being of a non-circular shape at the base portion when placed on said rim and adapted to be held in tight engagement with said tire engaging surfaces by the internal inflating pressure, and said rim being so constructed that said carcass is prevented from attaining a circular shape when the tire is inflated.

5. A tire and rim assembly comprising a rim having inwardly facing annular tire engaging beads on its outer periphery and spaced conical annular shoulders, a circumferential center well formed between said shoulders, spoke nipples extending into said well, said tire having a carcass, a covering of rubber composition for said carcass, said covering forming a tread, outer side walls, and a supporting base for engaging said rim, said side wall covering having circumferential grooves adapted to engage said beads, said base having a relatively thick wall disposed between said grooves, said thick wall having annular conical shoulders complementary to and engaging said annular shoulders on said rim, said thick wall being suspended between said shoulders out of contact with said rim and adapted to contact with said nipples when the tire is inflated, said carcass being of a non-circular shape at the base portion when placed on said rim and adapted to be held in tight engagement with said tire engaging surfaces by the internal inflating pressure, and said rim being so constructed that said carcass is prevented from attaining a circular shape when the tire is inflated.

JOHN E. CADY.